(12) United States Patent
Budinich et al.

(10) Patent No.: US 10,222,837 B1
(45) Date of Patent: Mar. 5, 2019

(54) DISPLAY MODULE HAVING A REMOVABLY FIXED RETENTION MEMBER

(71) Applicant: Microsoft Technology Licensing, LLC, Redmond, WA (US)

(72) Inventors: Paul William Budinich, Kenmore, WA (US); Tao Liu, Redmond, WA (US); Kameron Jerome Bumb, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/961,433

(22) Filed: Apr. 24, 2018

(51) Int. Cl.
*G06F 1/16* (2006.01)
(52) U.S. Cl.
CPC .......... *G06F 1/1654* (2013.01); *G06F 1/1626* (2013.01); *G06F 1/1643* (2013.01); *G06F 1/1656* (2013.01)
(58) Field of Classification Search
None
See application file for complete search history.

(56) References Cited

U.S. PATENT DOCUMENTS

| | | | |
|---|---|---|---|
| 8,031,289 B2 | 10/2011 | Naritomi | |
| 8,462,517 B2 | 6/2013 | Wojack et al. | |
| 8,508,927 B2 | 8/2013 | Chen | |
| 9,411,385 B2 | 8/2016 | Pierce et al. | |
| 9,781,847 B2 | 10/2017 | Sun et al. | |
| 2007/0223187 A1 | 9/2007 | Chou et al. | |
| 2011/0228460 A1 | 9/2011 | Kim et al. | |
| 2012/0097671 A1 | 4/2012 | Gu et al. | |
| 2016/0110004 A1 | 4/2016 | Huston et al. | |
| 2016/0195968 A1 | 7/2016 | Zhan | |

FOREIGN PATENT DOCUMENTS

CN 204129708 U 1/2015

OTHER PUBLICATIONS

"Korg M3: Touch Screen Replacement Guide", Retrieved From <<http://www.karma-lab.com/Files/m3/Korg_M3_Touch_Screen_Replacement_Guide.pdf>>, Retrieved on: Feb. 8, 2018, 21 Pages.

*Primary Examiner* — Xanthia C Cunningham
(74) *Attorney, Agent, or Firm* — Arent Fox LLP

(57) ABSTRACT

The present disclosure provides a display module having a removably fixed retention member that allows disassembly of a computer device, for example, to improve the ease of field repair. The computer device includes a chassis frame forming an outer edge of the device. The chassis frame including a first slot defining a first portion of a keyway, and the display module having a retention member including a second slot forming a second portion of the keyway between the chassis frame and the retention member. The retention element is moveable within the keyway to contact both the retention member and the chassis frame. The computer device may include a compression gasket located between the chassis frame and the retention member. When the compression gasket is held in a compressed state, the first portion and the second portion of the keyway are aligned to allow movement of the retention element.

20 Claims, 8 Drawing Sheets

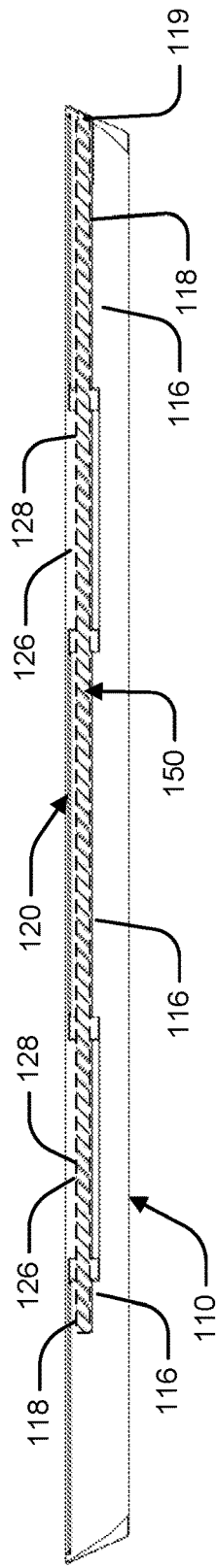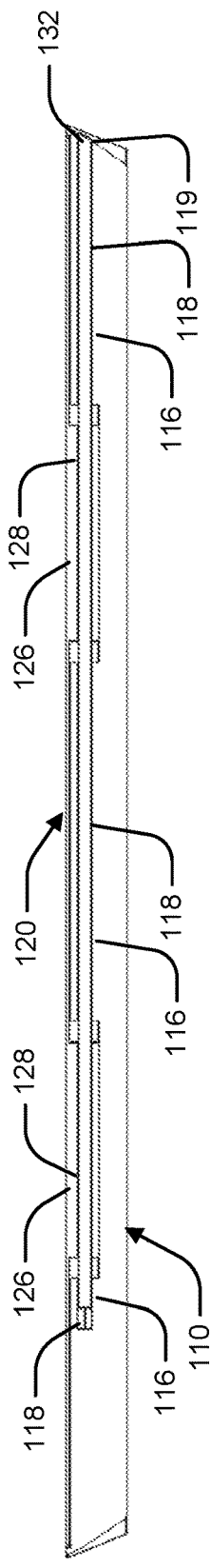
FIG. 5A
FIG. 5B

DISPLAY MODULE HAVING A REMOVABLY FIXED RETENTION MEMBER

BACKGROUND

The present disclosure relates to a device including a display module, and more particularly, to a retention member for releasably or removably mounting the display module to the device.

There is an ever-increasing consumer demand for computer devices including display modules such as touch display modules. A touch display module generally includes a display for outputting an image generated by the computer device and sensors for receiving input. Electronic components of the computer device are typically located within a recess in a chassis, carrier, or housing. The touch display module is then mounted on the chassis, over the recess. Typically, touch display modules are mounted to the chassis of the computer device using some form of adhesive. While adhesives provide a durable bond between the touch display module and the carrier, the durable bond makes access to the electronic components, or repair or replacement of the touch display module, difficult. For example, heat may be applied to debond the adhesive, but this procedure can be messy, time consuming, and make lead to breakage. Specialized equipment may be used to open the computer device and access the electronic components without damage, however, costs may be associated with the specialized equipment and shipping computer devices to repair facilities having the specialized equipment.

Thus, there is a need in the art for improvements in display module mounting and repair/replacement techniques.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a device including a chassis frame forming an outer edge of the device. The chassis frame including a first slot defining a first portion of a keyway. The device includes a display module having a retention member including a second slot forming a second portion of the keyway between the chassis frame and the retention member. The device includes a retention element removeably positionable within the keyway to contact both the retention member and the chassis frame.

Another example implementation relates to a method of assembling a computer device having a display module. The method includes inserting a display module into a chassis frame forming at least an outer edge of the device defining a first portion of a keyway into a chassis frame forming an outer edge of the device. The display module includes a retention member having a first slot defining a first portion of a keyway and the chassis frame a second slot defining a second portion of the keyway. The method includes removably positioning a retention element within the keyway to contact both the retention member and the chassis frame.

Another example implementation relates to a display module retention system. The display module retention system includes a projection within a chassis frame, the projection including a first slot defining a first portion of a keyway. The display module retention system includes a retention member attached to the display module, the retention member including a second slot forming a second portion of the keyway. The display module retention system includes a compression gasket located between the projection and the retention member, wherein the first portion and the second portion of the keyway are aligned when the compression gasket is in a compressed state. The display module retention system includes a retention element moveable within the keyway to contact both the retention member and the chassis frame when the first portion and the second portion of the keyway are aligned.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

In the drawings:

FIG. 5A is a cross-sectional view along the line 5-5 in FIG. 4 without a retention element;

FIG. 5B is a cross-sectional view along the line 5-5 in FIG. 4 with a retention element;

DETAILED DESCRIPTION

Figure 1:
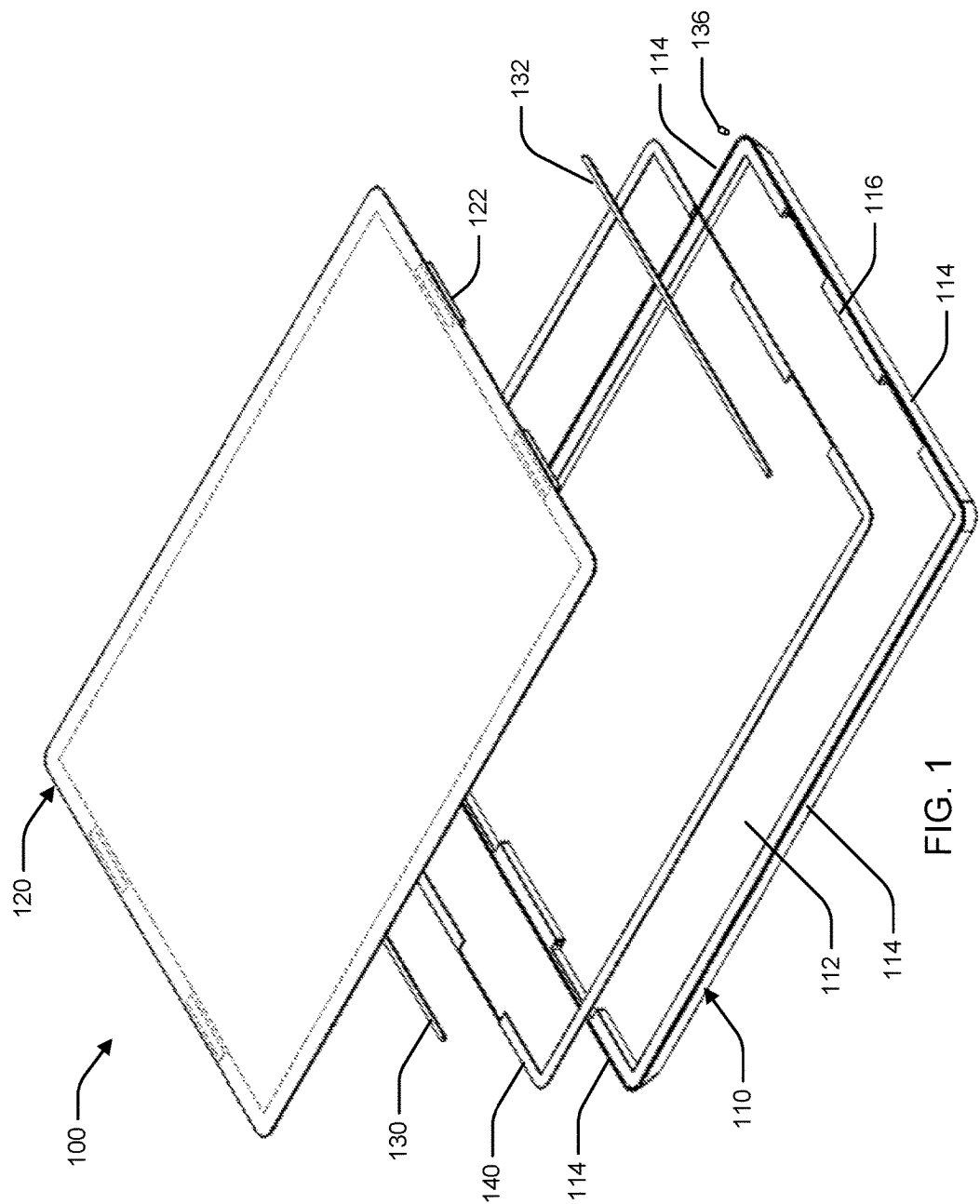
FIG. 1 is an exploded perspective view of a portion of an example computer device assembly according to this disclosure, the portion including, among other features, a touch display module, a chassis frame, a compression gasket, and first and second retention elements.

The present disclosure includes computer device assembly including a chassis frame to which a display module may be mounted. In some implementations, one or both of the chassis frame and the display module may form outer surfaces of the computer device. The display module is removably fixed to the chassis frame via a retention element removably positionable within a keyway formed between the display module and the chassis frame. A first portion of the keyway may be formed by a first slot in the chassis frame, or in a projection extending from or fixed to the chassis frame, and a second portion of the keyway may be formed by a second slot in a retention member extending from or fixed to the display module. The retention element is moveable with respect to the keyway to selectively engage or disengage the retention member relative to the chassis frame to allow the display module to be removed from the chassis frame. As such, the retention member and retention element form a reworkable, releasable connection that allows the computer device and electronic components thereof to be serviced.

In an implementation, a compression gasket is positioned between the chassis frame, and/or projection, and the display module, and/or retention member. When a defined amount of external compressive force or pressure is applied to display module, the compression gasket is compressed to a predetermined compression level, the two portions of the keyway align to allow insertion of the retention element into the keyway and/or movement of the retention element within or out of the keyway. In an uncompressed state, the compression gasket is sized to prevent alignment of the two portions of the keyway. When the defined amount of compressive force or pressure is removed, and if the retention element is positioned within they keyway spanning the two portions, the two portions receive a spring force exerted by the compression gasket thus transfer a shear force to the retention element. The shear force may produce sufficient friction to resist or prevent movement of the retention element within the keyway. Accordingly, in order to remove the retention element, the defined amount of external compressive force corresponding to the predetermined compression level may be re-applied to the display module to release or reduce the shear force transferred by the portions of the keyway, thereby enabling movement of the retention element out of the keyway.

In one implementation, the retention element is a longitudinally extending rod that is slidable through an opening in the chassis frame into the keyway. In an example, the keyway is located along an edge of the chassis frame and extends at least half of a length of the edge, preferably extending for substantially the length of the edge. Further, for instance, at least two edges or all edges of the computer device may include such a keyway for receiving a corresponding retention element. To prevent ingress of debris into the keyway and improve an external aesthetic appearance of the computer device, a plug may be inserted into the opening to seal the keyway by forming an interference fit with the opening. The plug may be integral with the retention element, and may also have an external surface that matches an appearance and structure (e.g., height) of an external surface of the computer device.

In another implementation, the retention element may be formed from or may include a magnetic or ferrous material, and the retention element may be positionable within one of the first or second portions of the keyway. For example, one portion of the keyway is dimensioned to hold the retention element in a first position within the portion when the chassis frame and display module are separated. Further, the retention element is moveable to a second position that spans the first portion and the second portion of the keyway. For example, a magnetic field may be applied to move the retention element from the first position to the second position. As discussed above, this implementation may also include the compression gasket, which may apply a spring force to the portions of the slot, causing a shear force on the retention element to resist or prevent movement out of the second position when the display module is mounted in the chassis frame.

Referring to FIGS. 1-5, in an example implementation, a computer device 100 includes a chassis frame 110, touch display module 120, retention elements 130, 132, and a compression gasket 140.

Figure 2:
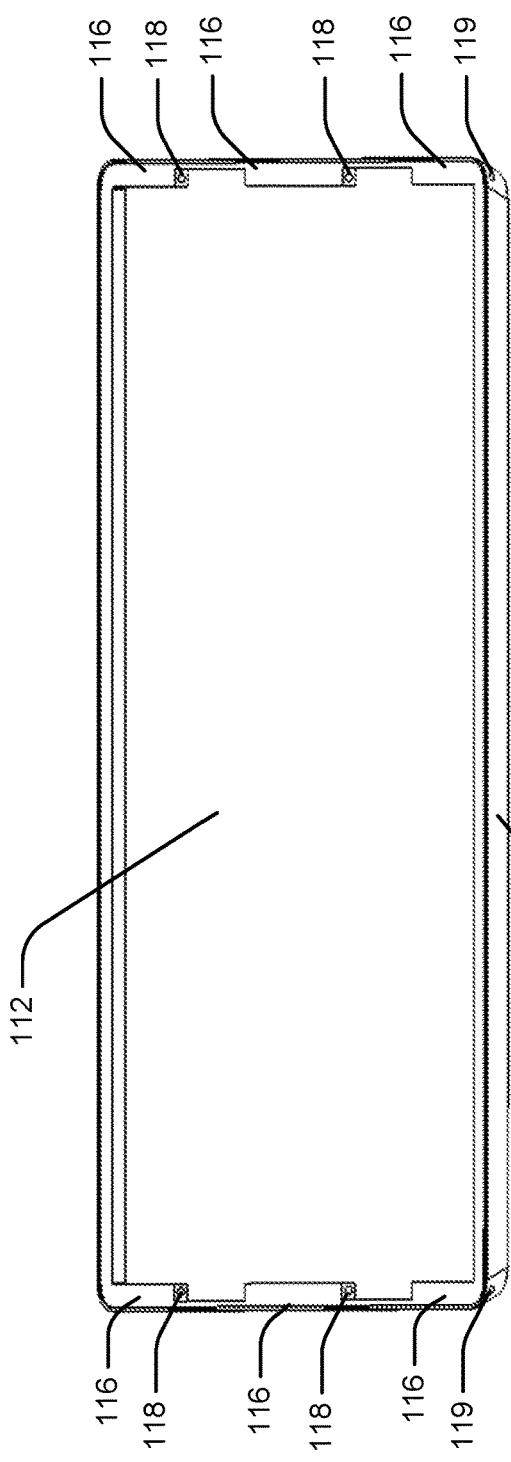
FIG. 2 is a perspective view of an implementation of the chassis frame of the example computer device assembly of FIG. 1.
Figure 3:
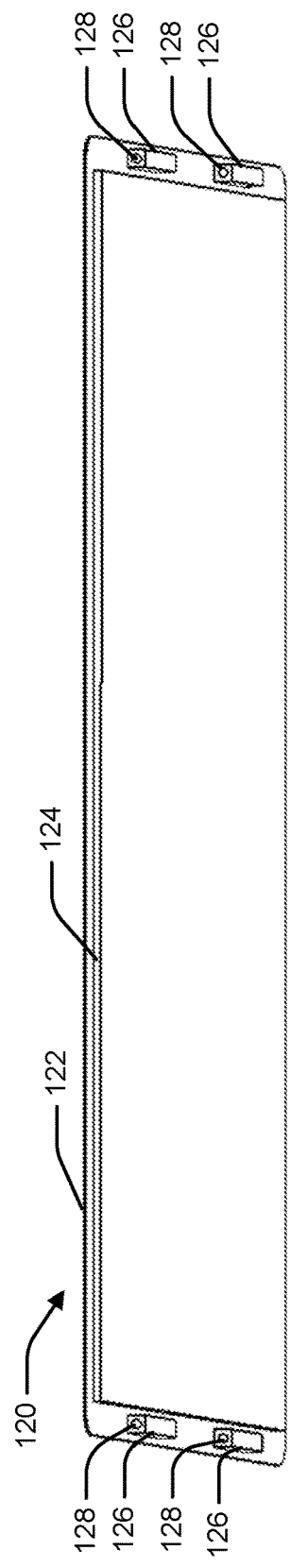
FIG. 3 is a perspective view of an implementation of the touch display module of the example computer device assembly of FIG. 1.
Figure 4:
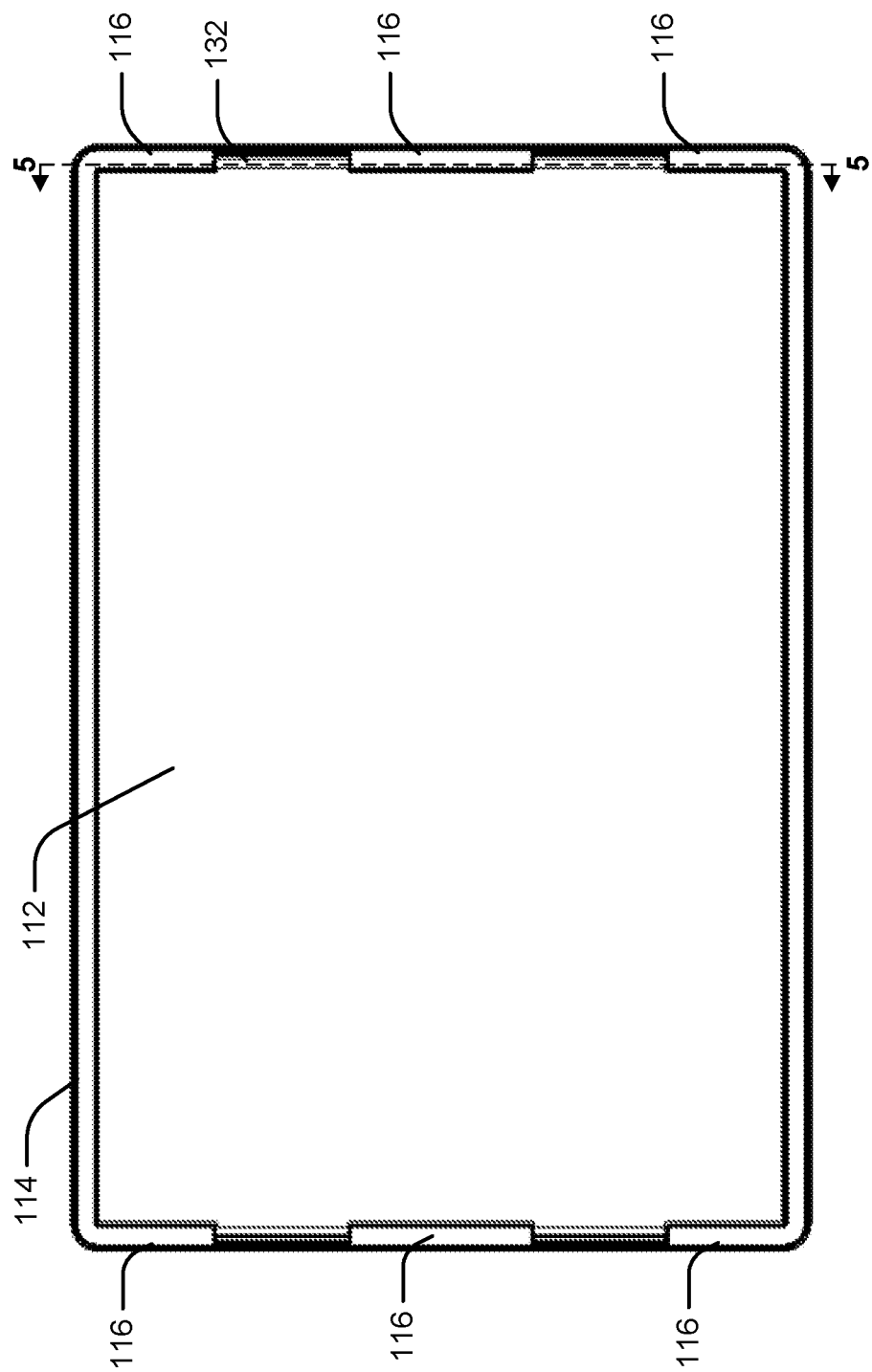
FIG. 4 is a top view of the chassis frame of the example computer device assembly of FIG. 1.

For example, the chassis frame 110 of computer device 100 is defined, at least in part, by a panel 112 and walls 114 that define an internal cavity. The walls 114 may be a continuous wall extending upward around a perimeter of the panel 112. In other words, the panel 112 may be a back wall, and the walls 114 may be side walls extending from the back wall. The panel 112 and/or the walls 114 may include a projection 116 that extends upward from a face of the panel 112 and/or that extends inward from the respective wall 114 toward a center of the panel 112. In the illustrated example, as best seen in FIG. 2, the projection 116 is a block or thickened portion of the wall 114 that includes a slot 118 through the projection 116. That is, the slot 118 may be an inner wall defining a through-hole in the projection 116. Multiple projections 116 may be formed along an inner surface of a wall 114, and projections 116 may be formed on multiple walls 114. As illustrated, projections 116 are formed on opposing short walls 114. The walls 114 may include an opening 119 through the wall 114 that connects to a slot 118 of a projection 116. The projection(s) 116 may be an integral portion of the panel 112 and/or the walls 114, or a separate member fixedly attached to a surface of the panel 112 and/or the walls 114. As such, the projection(s) 116 may be formed from a substantially rigid material, such as a metal or a relatively rigid, substantially non-elastic plastic or polymer.

The touch display module 120 may include a touch panel assembly 122 optically bonded to a display module 124. The touch panel assembly 122 is configured to support touch functionality, such as through use of one or more sensors to detect proximity of an object. The touch panel assembly may have an outer glass surface. The display module 124 may be secured within a display housing. The display module 124 may be configured in a variety of different ways, such as a liquid crystal display (LCD) module, an organic light emitting diode (OLED) module, and so on. In some implementations, the display module 124 may be utilized without the touch panel assembly 122. The display module 124 may include an outer glass surface without additional sensors.

The touch display module 120 includes at least one retention member 126 that includes a slot 128. For example, as illustrated, the touch display module 120 includes a total of four retention members 126 with two retention members 126 located along each short side. The retention members 126 extend down from the touch display module 120 past the display module 124. The retention members 126 may be formed from various materials including plastics and metals. In an implementation, the retention member 126 may be non-ferrous to avoid effects on a magnetic retention element. The retention members 126 may be connected to the touch panel assembly 122 and/or the display module 124 using a permanent adhesive. Each retention member 126 may include one or more slots 128. Each slot 128 may be an inner wall defining a through-hole in the projection 116.

The touch display module 120 may be mounted inside the chassis frame 110 such that the projections 116 and retention members 126 align, as best seen in FIG. 5A. In particular, the slots 118 may align with adjacent slots 128 to form a keyway 150, where each slot 118, 128 forms a portion of the keyway. For example, the projections 116 and retention members 126 may be interleaved such that slots 118 and slots 128 form alternating portions of the keyway 150. The slots 118 and 128 may form the keyway 150 when substantially aligned along a longitudinal axis parallel to a plane of the touch display module 120. The slots 118 and 128 may be substantially aligned, for example, when a dimension of the overlapping cross-sectional areas of the slots 118 and 128 is greater than a cross-sectional dimension of the retention element 130, 132. The opening 119 may also connect to a slot 118 and form a portion of the keyway 150. The keyway 150 may extend along an edge of the computer device 100, for example, substantially parallel to a wall 114. The keyway 150 may extend substantially a length of an edge of the device 100. For example, the keyway 150 may extend at least half of the length of the edge of the device 100 and preferably extend 70, 80, or 90 percent of the length of the edge of the device 100.

The retention elements 130, 132 may be generally elongate rods. The retention elements 130, 132 may be formed of a generally rigid material such as metal, plastic, or glass-fiber filled plastic such that the retention element 130, 132 retains its shape and does not fracture when shear forces are applied by a compression gasket 140. The retention elements 130, 132 may be inserted into respective keyways 150 formed by the slots 118, 128 via the openings 119, as best seen in FIG. 5B. When inserted, each retention element 130, 132 may span at least two portions of the keyway 150 (e.g., slot 118 and slot 128), thereby coupling the projections 116 to adjacent retention members 126 and coupling the touch display module 120 to the chassis frame 110. The retention element 130, 132 may extend substantially a length of an edge of the device 100. For example, the retention element 130, 132 may extend at least half of the length of the edge of the device 100 and preferably extend 70, 80, or 90 percent of the length of the edge of the device 100. The retention element 130, 132 may have a cross-sectional shape that facilitates movement in an intended direction and resists twisting. For example, a retention element 130, 132 that slides longitudinally may have a circular, square, rectangular, or other polygonal shape. Additionally, the retention element 130, 132 and/or the keyway 150 may include a reduced friction layer such as, for example, a gel, lubricant, grease, or polymer with low coefficient of friction lining an external surface of the retention element 130, 132 and/or an internal surface of the keyway 150.

A plug 136 may be inserted into the opening 119 to seal the keyway 150. The plug 136 may be formed of a deformable material (e.g., rubber or silicone). The plug 136 may deform when inserted into the opening 119 and form an interference fit with the inner surface of the opening 119. In an implementation, the plug 136 may be attached to a retention element 130, 132. For example, the plug 136 may be molded at an end of the retention element 130, 132 such that the plug is positioned in the opening 119 when the retention element 130, 132 is positioned in the keyway. The plug 136 may be used as a grip to facilitate movement of the retention element 130, 132. In an implementation, the retention element 130, 132 may include a wider head or other feature for engaging the plug 136 or providing a grip to facilitate movement of the retention element 130, 132.

The compression gasket 140 may form a seal between the chassis frame 110 and the touch display module 120. The compression gasket 140 may be formed of a compressible material such as a one-sided pressure sensitive adhesive or foam core. The compression gasket 140 may have an uncompressed state and a nominally compressed state. The nominally compressed state may be achieved when a predefined compressive force is applied to the compression gasket 140. For example, the predefined compressive force may be in the range of 20-50 pounds per square inch (PSI). A narrower range may be defined for a specific implementation. The predefined compressive force may compress the compression gasket 140 to a thickness that allows the slots 118 to align with the slots 128. Accordingly, when the compression gasket 140 is in the nominally compressed state, the retention element 130, 132 may be moved within the keyway. In particular, the retention element 130, 132 may slide longitudinally through the keyway.

In the uncompressed state (e.g., when less than the predefined compressive force is applied), the thickness of the compression gasket 140 may prevent alignment of the slots 118 and the slots 128. The compression gasket 140 may exert a spring force on both the chassis frame 110 and the retention member 126. If the retention element 130, 132 is positioned in the keyway, the spring force of the compression gasket 140 may result in a shear force to the retention element 130, 132. For example, by applying a separating spring force to the chassis frame 110 and the retention member 126, compression gasket 140 may cause the slot 118 to apply a downward force on the retention element 130,132 while the slot 128 applies an upward force on the retention element 130, 132. The shear forces may provide sufficient friction to prevent the retention element 130, 132 from moving within the keyway when the compression gasket 140 is in the uncompressed state. When a pressure greater than the predefined compressive force is applied, the compression gasket 140 may have a thickness such that the slots 118 and the slots 128 are no longer aligned. Accordingly, applying too great of pressure, or applying pressure unevenly may not allow the retention element 130,132 to move.

Figure 6:
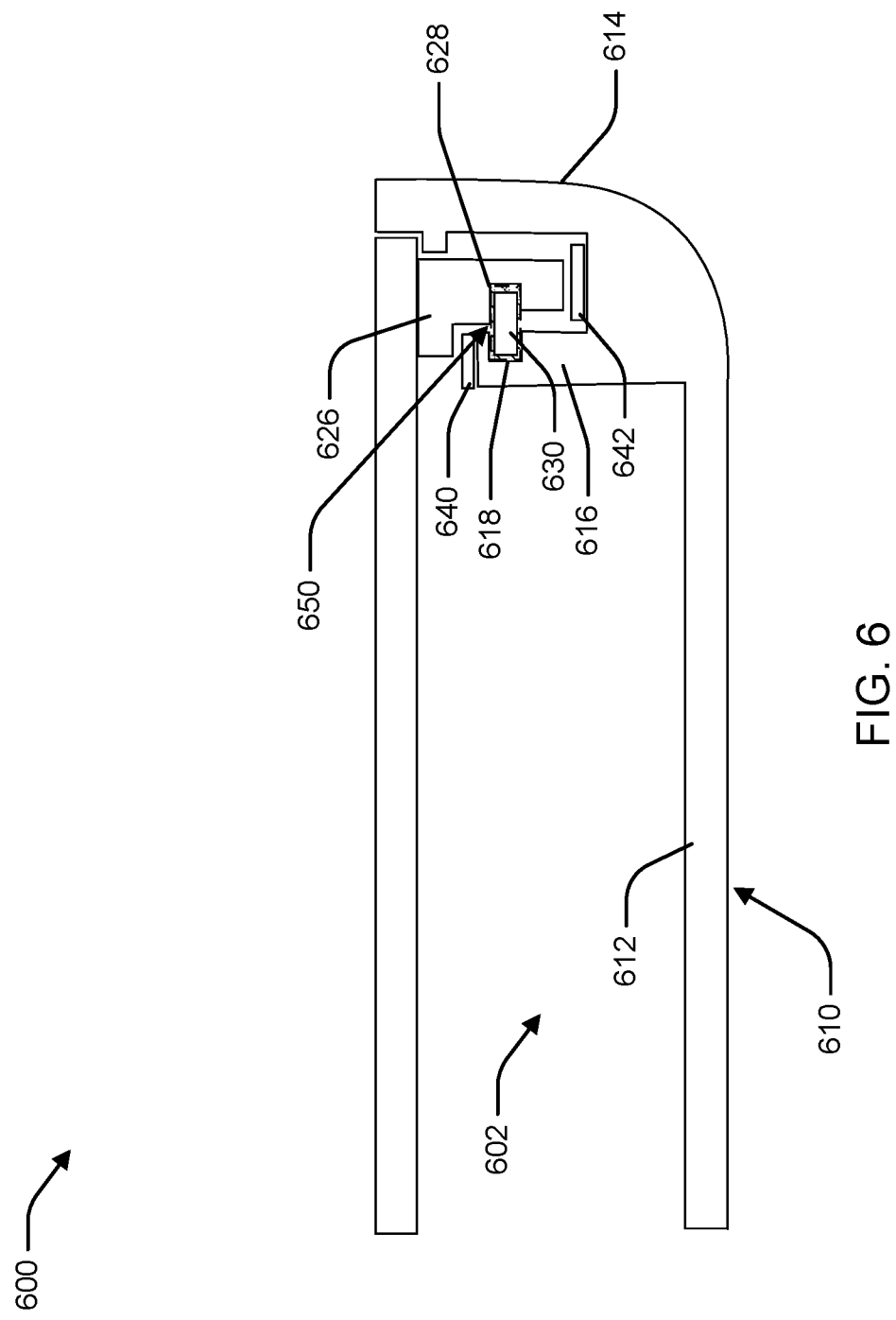
FIG. 6 is a partial cross-sectional view of another example computer device assembly according to this disclosure that includes parallel retention members forming a keyway.

Referring to FIG. 6, another implementation of a computer device 600 includes a chassis frame 610 and touch display module 620 coupled via a retention element 630 retained in another example keyway 650. The chassis frame 610 and touch display module 620 may be similar to the chassis frame 110 and touch display module 120. The chassis frame 610 may include a projection 616 that extends upward from a back panel 612 toward the touch display module 620. The projection 616 includes a slot 618 that faces toward the wall 614. The slot 618 may extend a length of the projection 616, which may be at least half of a length of the wall 614, and preferably substantially the length of the wall 614. The touch display module 620 includes a retention member 626 extending from a back surface of the touch display module 620. The retention member 626 includes a slot 628 that faces away from the wall 614 toward the projection 616. The slot 628 may extend a length of the retention member 626, which may be at least half of a length of the wall 614, and preferably substantially the length of the wall 614. As illustrated, the slot 628 may align with the slot 618 to form a keyway 650 for the retention element 630.

The computer device 600 may include compression gasket 640 and/or compression gasket 642 between the touch display module 620 and the chassis frame 610. In particular, the compression gasket 640 may be located between an end of the projection 616 and a surface of the retention member 626 and the compression gasket 642 may be located between an end of the retention member 626 and a base of the projection 616. The use of two compression gaskets 640, 642 may allow direct application of a separation force to each of the projection 616 and the retention member 626. Additionally, the use of two compression gaskets 640, 642 may provide an additional seal between the cavity 602 and an outside environment.

Figure 7:
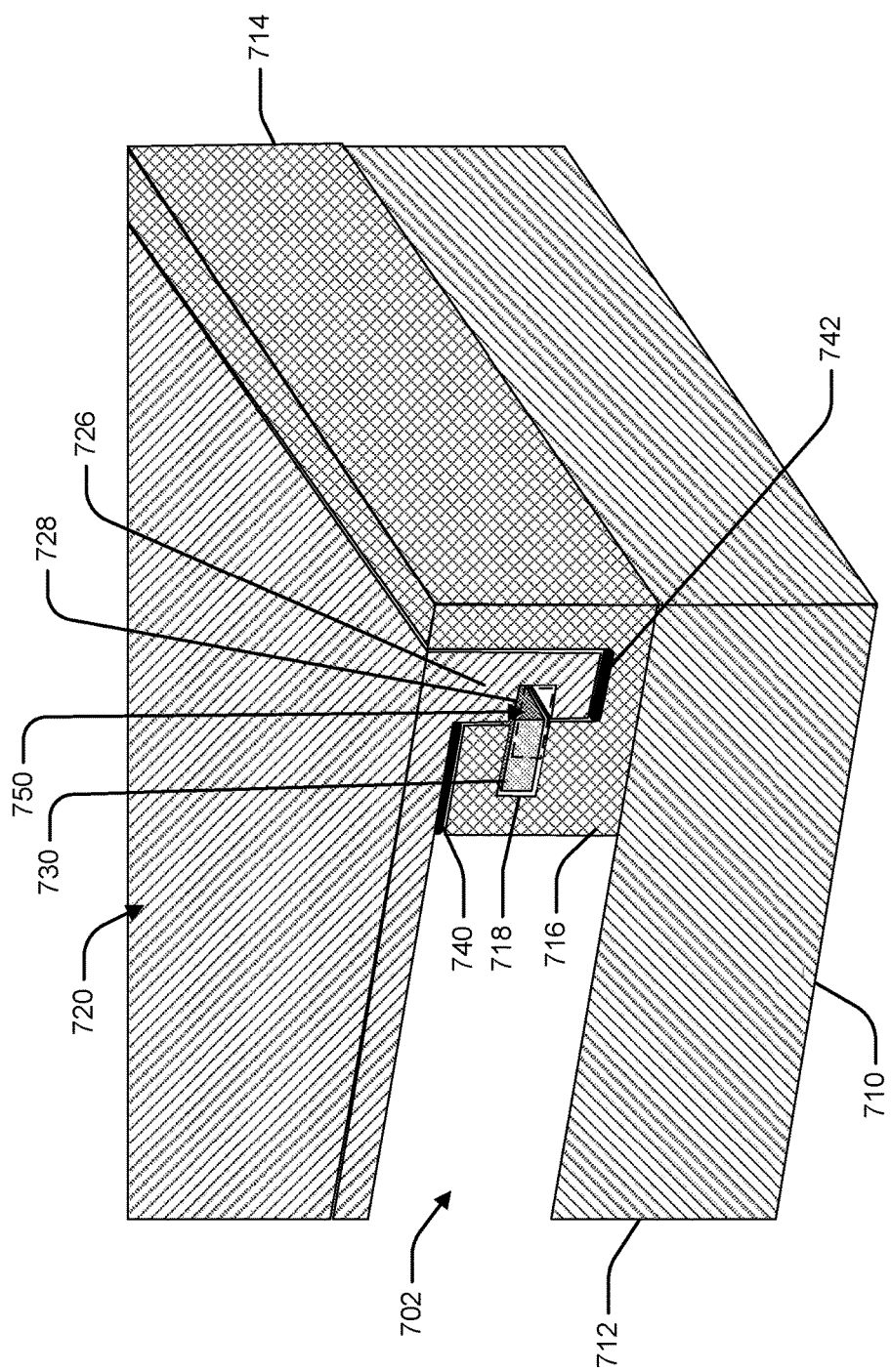
FIG. 7 is a partial cross-sectional view of another example computer device assembly according to this disclosure that includes a magnetic retention element.

Referring to FIG. 7, another implementation of a computer device 700 includes a chassis frame 710 and touch display module 720 coupled via a magnetic retention element 730 retained in another example keyway 750.

The chassis frame 710 and touch display module 720 may be similar to the chassis frame 110 and touch display module 120. The chassis frame 710 may include a projection 716 that extends upward from a back panel 712 toward the touch display module 720. The projection 716 includes a slot 718 that faces toward the wall 714. The slot 718 may have a width at least as great as a width of the retention element 730 such that the magnetic retention element 730 may be positioned entirely within the slot 718. For example, the magnetic retention element 730 may be positioned entirely within the slot 718 when the touch display module 720 is inserted into or removed from the chassis frame 710. The retention member 726 extends from the touch display module 720 toward the back panel 712. The retention member 726 includes a slot 728 that aligns with the slot 718 to form a keyway 750.

The magnetic retention element 730 may include a magnetic material (e.g., rare earth metals) or a ferrous material (e.g., iron or steel). Instead of being manually moved longitudinally into and out of the keyway 750, the magnetic retention element 730 may be moved laterally from the position entirely within the slot 718 to a position spanning the slot 718 and the slot 728 by applying a magnetic field to the magnetic retention element 730. The magnetic field may exert either an attracting or repelling force to the magnetic retention element 730. The polarity of the magnetic field may be reversed to move the magnetic retention element 730 in the opposite direction. The direction of movement of the magnetic retention element 730 may be substantially perpendicular to a closest edge of the computer device 700 to facilitate application of a magnetic field to move the magnetic retention element 730.

Similar to the slots 118 and 128, the slots 718 and 728 may extend a length of the projection 716, which may be at least half of a length of the wall 714, and preferably substantially the length of the wall 714. In another implementation, instead of a single retention element, multiple magnetic retention elements 730 may be spaced along an edge of the computer device 700 within multiple separate slots 718 and 728. A magnetic field may be applied individually to each magnetic retention element 730. Since the magnetic retention element 730 does not require direct physical contact, an opening (e.g., opening 119) between the keyway 750 and an external surface of the computer device 700 may not be necessary.

Figure 8:
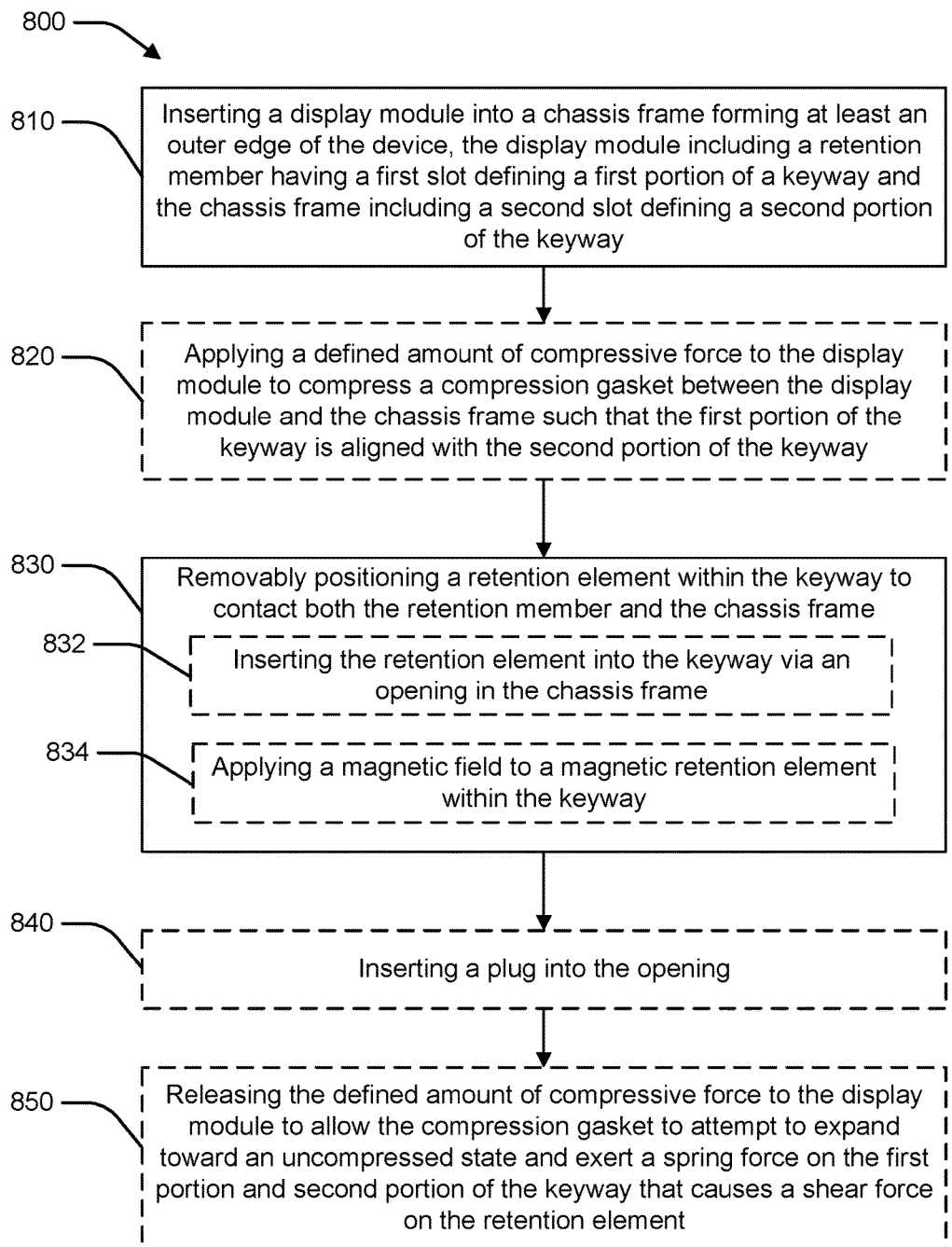
FIG. 8 is a flow diagram of an example method of assembling a computer device.

Referring to FIG. 8, an example of a method 800 of assembling a computer device including a chassis frame 110, 610, 710 and a touch display module 120, 620, 720, may include a number of actions that may performed in series, in parallel, or in a different order than presented herein. Optional actions are shown with dashed lines. The method 800 may be performed by a human or robot assembly technician using the components and tools described herein.

At 810, the method 800 may include inserting a display module into a chassis frame forming at least an outer edge of the device, the display module including a retention member having a first slot defining a first portion of a keyway and the chassis frame including a second slot defining a second portion of the keyway. For instance, the technician may insert the touch display module 120, 620, 720 into a chassis frame 110, 610, 710 forming at least an outer edge of the device 100, the touch display module 120, 620, 720 including a retention member 126, 626, 726 having a first slot 128, 682, 728 defining a first portion of a keyway 150, 650, 750 and the chassis frame 110, 610, 710 including a second slot 118, 618, 718 defining a second portion of the keyway At 820, the method 800 may optionally include applying a defined amount of compressive force to the display module to compress a compression gasket between the display module and the chassis frame such that the first portion of the keyway is aligned with the second portion of the keyway. For instance, the technician may apply the defined amount of compressive force to the touch display module 120, 620, 720 to compress the compression gasket 140, 640, 642, 740, 742 between the touch display module 120, 620, 720 and the chassis frame 110, 610, 710 such that the first portion of the keyway (e.g., slot 118) is aligned with the second portion of the keyway (e.g., slot 128).

At 830, the method 800 may include removably positioning a retention element within the keyway to contact both the retention member and the chassis frame. For instance, the technician may removably position the retention element 130, 132, 630, 730 within the keyway 150, 650, 750 to contact both the retention member 126, 626, 726 and the chassis frame 110, 610, 710. For example, the retention element 130, 132, 630, 730 may contact the slot 128, 628, 728 of the retention member 126, 626, 726 and contact the slot 118, 618, 718 of the projection 116, 616, 716 of the chassis frame 110, 610, 710. At 832, removably positioning the retention element may include inserting the retention element into the keyway via an opening in the chassis frame. For example, the technician may insert the retention element 130, 132 into the keyway 150 via the opening 119 in the chassis frame 110. At 834, removably positioning the retention element may include applying a magnetic field to a magnetic retention element within the keyway. For instance, the technician may apply the magnetic field to the magnetic retention element 730.

At 840, the method 800 may optionally include inserting a plug into the opening. For example, the technician may insert the plug 136 into the opening 119.

At 850, the method 800 may optionally include releasing the defined amount of compressive force to the display module to allow the compression gasket to attempt to expand toward an uncompressed state and exert a spring force on the first portion and second portion of the keyway that causes a shear force on the retention element. For instance, the technician may release the defined amount of compressive force to the touch display module 120, 620, 720 to allow the compression gasket 140, 640, 642, 740, 742 to attempt to expand toward an uncompressed state and exert a spring force on the first portion and second portion of the keyway that causes a shear force on the retention element 130, 132, 630, 730.

Figure 9:
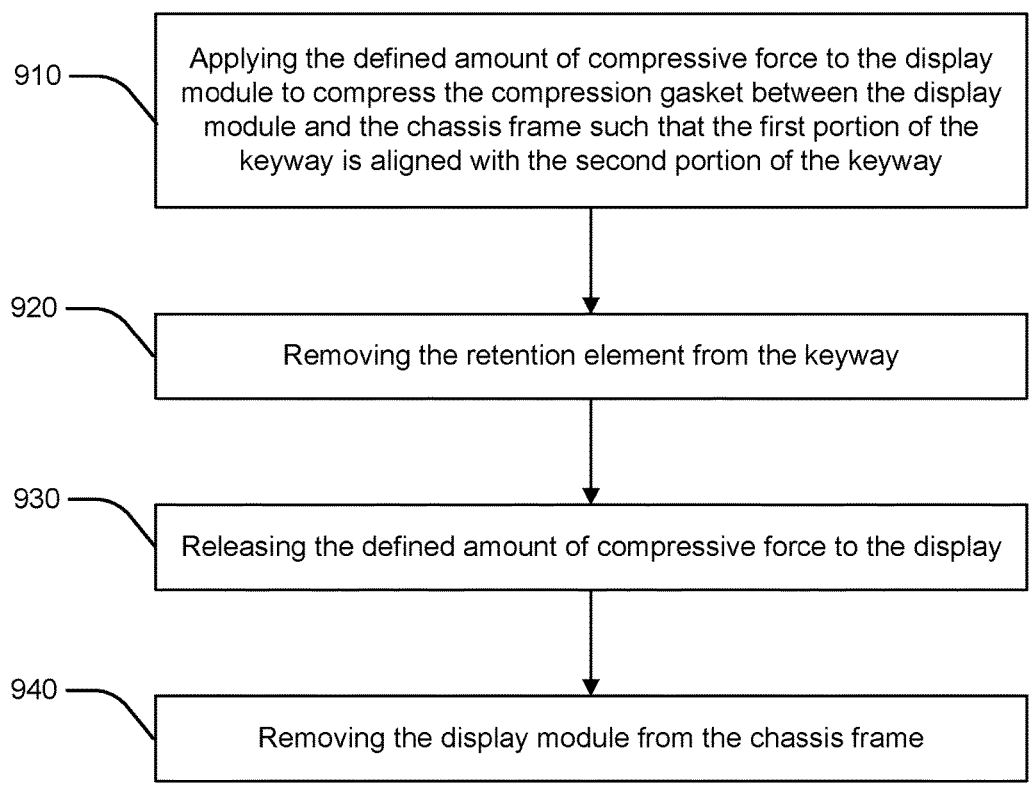
FIG. 9 is a flow diagram of an example method of disassembling a computer device.

Referring to FIG. 9, an example of a method 900 of disassembling a computer device including a chassis frame 110, 610, 710 and a touch display module 120, 620, 720, may include a number of actions that may performed in series, in parallel, or in a different order than presented herein. Optional actions are shown with dashed lines. The method 900 may be performed by a human or robot assembly technician using the components and tools described herein. Moreover, the method 900 may be performed in combination with the method 800. For example, the method 900 may be performed before the method 800 to allow serving of components within a cavity of the computer device.

At 910, the method 900 may include applying or re-applying the defined amount of compressive force to the display module to compress the compression gasket between the touch display module and the chassis frame such that the first portion of the keyway is aligned with the second portion of the keyway. For instance, the technician may apply the defined amount of compressive force to the touch display module 120, 620, 720 to compress the compression gasket 140, 640, 642, 740, 742 between the touch display module 120, 620, 720 and the chassis frame 110, 610, 710 such that the first portion of the keyway is aligned with the second portion of the keyway.

At 920, the method 900 may include removing the retention element from the keyway. For instance, the technician may remove the retention element 130, 132, 630, 730 from the keyway. The technician may remove the retention element 130, 132, 630 by sliding the retention element 130, 132, 630 longitudinally, e.g., by pulling. The technician may remove the magnetic retention element 730 by applying a magnetic force such that the magnetic retention element 730 is located entirely within the slot 718.

At 930, the method 900 may include releasing the defined amount of compressive force to the touch display. For instance, the technician may release the defined amount of compressive force to the touch display. Since the retention element 130, 132, 630, 730 is no longer located in the keyway, releasing the defined amount of compressive force may allow separation of the chassis frame 110, 610, 710 and the touch display module 120, 620, 720.

At 940, the method 900 may include removing the display module from the chassis frame. For instance, the technician may remove the touch display module 120, 620, 720 from the chassis frame 110, 610, 710.

In summary, one example implementation relates to a device including a chassis frame forming an outer edge of the device. The chassis frame including a first slot defining a first portion of a keyway. The device includes a display module having a retention member including a second slot forming a second portion of the keyway between the chassis frame and the retention member. The device includes a retention element removeably positionable within the keyway to contact both the retention member and the chassis frame.

In an implementation of the device, a compression gasket is located between the chassis frame and the retention member. The compression gasket has a compressed state and an uncompressed state. Additionally, when the compression gasket is in a compressed state, the first portion and the second portion of the keyway are aligned. Moreover, when the compression gasket attempts to expand toward the uncompressed state, the first portion and the second portion apply a shear force to the retention element that resists movement of the retention element.

In another implementation of the device, which may be combined with the previous implementations, the retention element is a longitudinally extending rod slidingly positionable relative to the retention member and the chassis frame. The chassis frame includes an external opening via which the rod may be inserted or removed. Additionally, the device may include a plug sized to fill the external opening.

In another implementation of the device, the retention element includes a magnetic element. The magnetic element is moveable between a first position entirely within the first slot or the second slot to a second position spanning the first slot and the second slot.

In another implementation, the device includes a projection extending at least one of inwardly from the outer edge of the chassis frame or upwardly from an inner wall surface of the chassis frame, the projection having a first inner wall defining a first through-hole that forms the first slot of the keyway, the retention member having a second inner wall defining a second through-hole that forms the second slot of the keyway, wherein the first through-hole and the second through-hole are substantially aligned along a longitudinal axis substantially parallel to a plane of the display module when the retention element is positioned to contact both the retention member and the chassis frame.

In one implementation of the device, which may be combined with the above implementations, the retention element extends parallel to a surface of the display module. Additionally, the retention element may extend at least half of a length of the outer edge of the device.

Another example implementation relates to a method of assembling a computer device having a display module. The method includes inserting a display module into a chassis frame forming at least an outer edge of the device defining a first portion of a keyway into a chassis frame forming an outer edge of the device. The display module includes a retention member having a first slot defining a first portion of a keyway and the chassis frame a second slot defining a second portion of the keyway. The method includes removably positioning a retention element within the keyway to contact both the retention member and the chassis frame.

In another implementation of the method, the method includes applying a defined amount of compressive force to the display module to compress a compression gasket between the display module and the chassis frame such that the first portion of the keyway is aligned with the second portion of the keyway.

In another implementation of the method, the method includes releasing the defined amount of compressive force to the display module to allow the compression gasket attempt to expand toward an uncompressed state and exert a spring force on the first portion and second portion of the keyway that causes a shear force on the retention element.

In an implementation of the method, which may be combined with the above implementations, removably positioning the retention element within the keyway includes inserting the retention element into the keyway via an opening in the chassis frame. The implementation may also include inserting a plug into the opening.

In an alternative implementation, removably positioning the retention element within the keyway includes applying a magnetic field to a magnetic retention element positioned within one of the first slot or the second slot of the keyway, causing the magnetic element to move between a first position entirely within the first slot or the second slot to a second position spanning the first slot and the second slot.

In another implementation of the method, the method includes re-applying the defined amount of compressive force to the display module to compress the compression gasket between the display module and the chassis frame to release the shear force. The method includes removing the retention element from the keyway. The method includes releasing the defined amount of compressive force to the display module. The method includes removing the display from the chassis frame.

Another example implementation relates to a display module retention system. The display module retention system includes a projection within a chassis frame, the projection including a first slot defining a first portion of a keyway. The display module retention system includes a retention member attached to the display module, the retention member including a second slot forming a second portion of the keyway. The display module retention system includes a compression gasket located between the projection and the retention member, wherein the first portion and the second portion of the keyway are aligned when the compression gasket is in a compressed state. The display module retention system includes a retention element moveable within the keyway to contact both the retention member and the chassis frame when the first portion and the second portion of the keyway are aligned.

In another implementation of the display module retention system, the compression gasket in the compressed state exerts a spring force on the first portion and the second portion that causes a shear force on the retention element that resists movement of the retention element within the keyway.

In another implementation of the display module retention system, the retention element extends parallel to a surface of the display module at least half of a length of the chassis frame.

As used in this application, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features have been presented in terms of assemblies that may include a number of devices, components, modules, and the like. It is to be understood and appreciated that the various assemblies may include additional devices, components, modules, etc. and/or may not include all of the devices, components, modules, etc., discussed in connection with the figures. A combination of these approaches may also be used.

While example implementations of the present disclosure have been described in this document, it will be understood by those skilled in the art that variations and modifications of the implementations described above may be made without departing from the scope of this disclosure. Other implementations will be apparent to those skilled in the art from a consideration of this description or from a practice in accordance with examples disclosed in this document. Thus, the following claims are intended to include other variations and implementations of the present disclosure.

What is claimed is:

1. A device, comprising:
   a chassis frame forming an outer edge of the device, the chassis frame including a first slot defining a first portion of a keyway;
   a display module having a retention member including a second slot forming a second portion of the keyway between the chassis frame and the retention member; and
   a retention element slidably positioned within the keyway to contact both the retention member and the chassis frame.

2. The device of claim 1, further comprising a compression gasket located between the chassis frame and the retention member, the compression gasket having a compressed state and an uncompressed state.

3. The device of claim 2, wherein when the compression gasket is in the compressed state, the first portion and the second portion of the keyway are aligned.

4. The device of claim 2, wherein when the compression gasket attempts to expand toward the uncompressed state, the first portion and the second portion apply a shear force to the retention element that resists movement of the retention element.

5. The device of claim 1, wherein the retention element is a longitudinally extending rod slidingly positionable relative to the retention member and the chassis frame, and wherein the chassis frame includes an external opening via which the rod may be inserted or removed.

6. The device of claim 5, further comprising a plug sized to fill the external opening.

7. The device of claim 1, further comprising a projection extending at least one of inwardly from the outer edge of the chassis frame or upwardly from an inner wall surface of the chassis frame, the projection having a first inner wall defining a first through-hole that forms the first slot of the keyway, the retention member having a second inner wall defining a second through-hole that forms the second slot of the keyway, wherein the first through-hole and the second through-hole are substantially aligned along a longitudinal axis substantially parallel to a plane of the display module when the retention element is positioned to contact both the retention member and the chassis frame.

8. The device of claim 1, wherein the retention element comprises a magnetic material, and wherein the retention element is moveable by a magnetic field between a first position entirely within either the first slot or the second slot to a second position spanning the first slot and the second slot.

9. The device of claim 1, wherein the retention element extends parallel to a surface of the display module.

10. The device of claim 1, wherein the retention element extends at least half of a length of the outer edge of the device.

11. A method of assembling a computer device having a display module, comprising:
    inserting the display module into a chassis frame forming at least an outer edge of the computer device, the display module including a retention member having a first slot defining a first portion of a keyway and the chassis frame including a second slot defining a second portion of the keyway; and
    slidably positioning a retention element within the keyway to contact both the retention member and the chassis frame.

12. The method of claim 11, further comprising applying a defined amount of compressive force to the display module to compress a compression gasket between the display module and the chassis frame such that the first portion of the keyway is aligned with the second portion of the keyway.

13. The method of claim 12, further comprising releasing the defined amount of compressive force to the display module to allow the compression gasket to attempt to expand toward an uncompressed state and exert a spring force on the first portion and the second portion of the keyway that causes a shear force on the retention element.

14. The method of claim 11, wherein removably positioning the retention element within the keyway comprises inserting the retention element into the keyway via an opening in the chassis frame.

15. The method of claim 14, further comprising inserting a plug into the opening.

16. The method of claim 11, wherein the retention element comprises a magnetic material, and wherein moving the retention element within the keyway comprises applying a magnetic field to the retention element positioned within one of the first slot or the second slot of the keyway, causing the retention element to move between a first position entirely within the first slot or the second slot to a second position spanning the first slot and the second slot.

17. The method of claim 13, further comprising:
re-applying the defined amount of compressive force to the display module to compress the compression gasket between the display module and the chassis frame to release the shear force;
removing the retention element from the keyway;
releasing the defined amount of compressive force to the display module; and
removing the display module from the chassis frame.

18. A display module retention system, comprising:
a projection within a chassis frame, the projection including a first slot defining a first portion of a keyway;
a retention member attached to a display module, the retention member including a second slot forming a second portion of the keyway;
a compression gasket located between the projection and the retention member, wherein the first portion and the second portion of the keyway are aligned when the compression gasket is in a compressed state; and
a retention element moveable within the keyway to contact both the retention member and the chassis frame when the first portion and the second portion of the keyway are aligned.

19. The display module retention system of claim 18, wherein the compression gasket in the compressed state exerts a spring force on the first portion and the second portion that causes a shear force on the retention element that resists movement of the retention element within the keyway.

20. The display module retention system of claim 18, wherein the retention element extends parallel to a surface of the display module at least half of a length of the chassis frame.

* * * * *